MAGNETIC MATERIALS WITH HIGH PERMEABILITY

Filed Nov. 1, 1963 2 Sheets-Sheet 1

INVENTORS
YUKIO ICHINOSE
ICHIRO FUKUMOTO
BY Paul M. Craig, Jr.
ATTORNEY

INVENTORS
YUKIO ICHINOSE
ICHIRO FUKUMOTO
BY Paul M. Craig, Jr.
ATTORNEY

United States Patent Office 3,264,100
Patented August 2, 1966

3,264,100
MAGNETIC MATERIALS WITH HIGH PERMEABILITY

Yukio Ichinose and Ichiro Fukumoto, Tokyo, Japan, assignors to Hitachi, Ltd., Tokyo, Japan, a corporation of Japan Filed Nov. 1, 1963, Ser. No. 320,714
Claims priority, application Japan, Nov. 7, 1962, 37/48,745
2 Claims. (Cl. 75—123)

Figure 1:
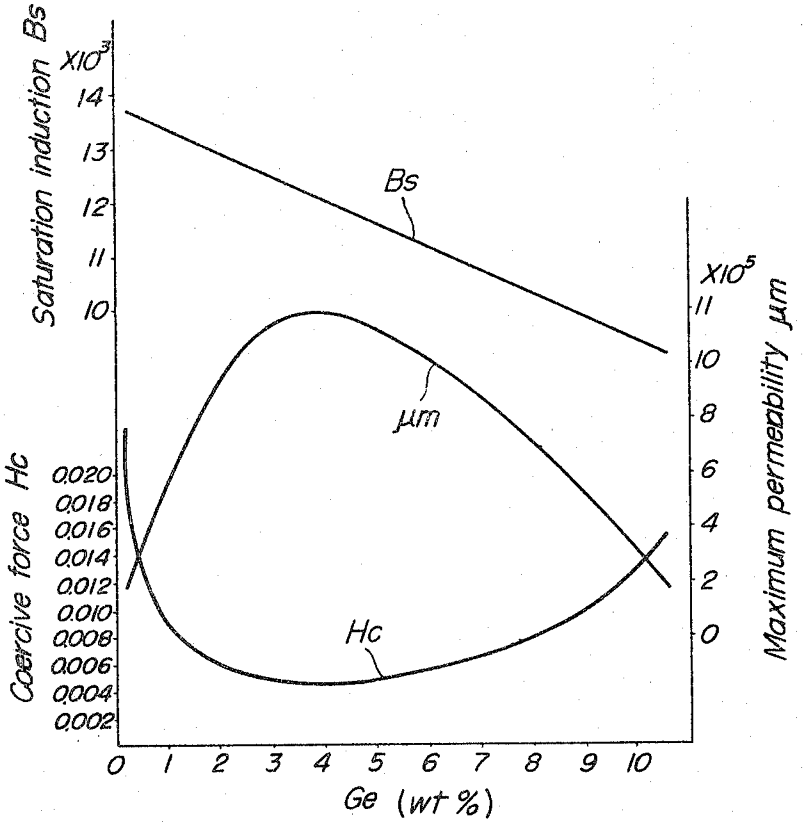

This invention relates to soft magnetic materials of the Ni-Fe alloy type containing from 40 to 90 percent by weight of nickel and from 0.1 to 10 percent by weight of germanium and has for its object to provide a magnetic material having excellent magnetic properties particularly suitable for use as magnetic cores in magnetic amplifiers, memory elements, etc.

The properties of soft magnetic materials that are important for their use in magnetic amplifiers, memory elements, etc. are low coercive force, high saturation induction, high rectangularity and high permeability. Also high resistivity is required of the materials from the practical standpoint. Previous materials employed in these applications include 4–79 Permalloy (4% Mo, 79% Ni, 0.3% Mn, remainder iron), Mumetal (77% Ni, 2% Cr, 5% Cu, remainder iron) and Supermalloy (5% Mo, 79% Ni, 0.3% Mn, remainder iron). These alloys have magnetic properties as listed in Table 1. They are, however, poor in rectangularity, have relatively low saturation inductions, and, excepting Supermalloy, have high coercive forces and low maximum permeabilities.

were previously subjected to annealing in the hydrogen atmosphere at 1,200° C. for two hours, air cooling and one-hour heating at 650° C. followed by magnetic annealing. As observed in the figure, the maximum permeability increases rapidly with increase in the germanium content to reach a maximum at 4% germanium content and then slowly decreases. In contrast, the coercive force initially decreases rapidly with increase in the germanium content to reach a minimum in the vicinity of 4% germanium content and then slowly increases. The saturation induction decreases in linear proportion to increase in the germanium content. It is to be noted that the 65 Ni-Fe alloy containing from 0.1 to 10% germanium far exceeds Supermalloy and other Ni-Fe alloys in maximum permeability and in coercive force and is comparable to or exceeds them in saturation induction. Also, the alloy containing from approximately 2 to 6% of germanium exhibits a maximum permeability of 1,000,000 or over and a saturation induction of from approximately 11 to 13 kilogauss. These magnetic property values considerably exceed those of Supermalloy, which has previously been considered as a magnetic material exhibiting the best magnetic properties. The resistivity obtained for the range of germanium content of from 0.1 to 10% has a value of from 25 to 45 $\mu\Omega$-Cm, which is only slightly lower than that of Permalloy or the like alloy.

Figure 2:
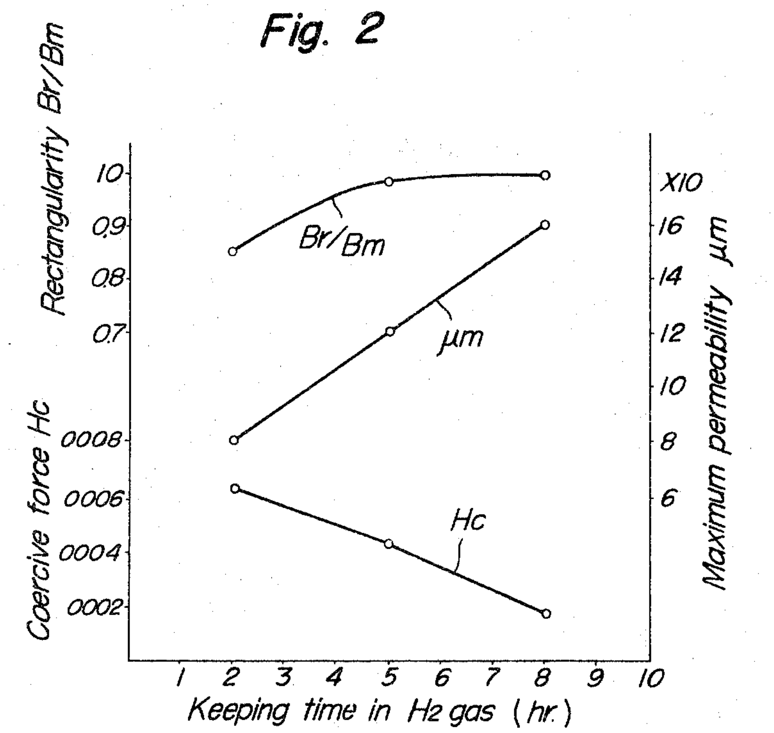

Reference is next made to FIG. 2, which illustrates the relationship of the magnetic properties of the inventive alloy to the time of hydrogen treatment or the time during which the alloy is kept in hydrogen gas. The samples were taken from an alloy containing 3.7%

TABLE 1

| Material | Composition, percent by weight, remainder iron | $\mu_m$, Maximum Permeability | $B_s$, Saturation induction, gauss | $H_c$, Coercive force, oersteds | $\rho$, Resistivity, $\mu\Omega$-cm. |
|---|---|---|---|---|---|
| 4–79 Mo Permalloy | 79 Ni, 4 Mo, 0.8 Mn | 100,000 | 8,700 | 0.05 | 55 |
| Mumetal | 77 Ni, 2 Cr, 5 Cu | 100,000 | 6,500 | 0.05 | 62 |
| Supermalloy | 79 Ni, 5 Mo, 0.8 Mn | 800,000 | 7,900 | 0.003 | 65 |
| Alloy of the invention | 65 Ni, 4 Ge | $16\times10^5$ | 12,200 | 0.0017 | 40 |

According to the present invention, a magnetic alloy is provided which obviates the above deficiencies previously involved in Ni-Fe alloys by an addition of germanium. The inventive alloy is characterized by high maximum permeability, high saturation induction, high rectangularity and low coercive force compared with those of conventional Ni-Fe alloys. The inventive alloy, when subjected to appropriate heat treatment, has exhibited a maximum permeability of 1,000,000 or over, a saturation induction of 10 kilogauss or over, a rectangularity of 0.9 or more, and a coercive force of the order of 0.002 oersted.

The magnetic alloy of the present invention will now be described in further detail with reference to the accompanying drawing, in which:

FIG. 1 is a chart graphically illustrating the relationship between the magnetic properties of the Ni-Fe alloy and its germanium content; and FIG. 2 is a chart graphically illustrating the relationship of the magnetic properties of 3.7 Ge–65 Ni-Fe alloy and the time of hydrogen treatment to which the alloy is subjected.

Reference is first made to FIG. 1, which illustrates the effects of germanium added to the 65 Ni-Fe alloy. In this figure is illustrated the manner in which the maximum permeability $\mu_m$, coercive force $H_c$ and saturation induction $B_s$ vary with variation in the germanium content in the Ni-Fe alloy. All of the samples used Ge, 65% Ni, 0.5% Mn and the remainder iron. They were treated in the hydrogen gas stream at 1,200° C. for the respective specified periods of time, air cooled, heated at 650° C. for one hour and then cooled in a magnetic field. As observed in FIG. 2, as the time of hydrogen treatment increases, the maximum permeability of the alloy increases while its coercive force decreases. The rectangularity initially increases and remains substantially constant after five hours of treatment. After an eight-hour treatment, the alloy exhibits a maximum permeability of 1,600,000, a coercive force of 0.0017 oersted, and a rectangularity of as high as 0.99. It will be evident that the magnetic properties of the inventive alloy can be further improved by the hydrogen treatment.

A further effect of the addition of germanium to the Ni-Fe alloy is that it facilitates production of clear magnetic alloys as it effects removal of nonmetallic inclusions, mainly oxides, which impair the coercive force of the alloy produced. This effect is illustrated in Table 2 which compares the contribution of molybdenum to the Curie temperature of Supermalloy with that of germanium. As observed, the contribution of Mo to the Curie temperature is about twice as large as that of germanium. In this respect, Mo has a larger influence upon the magnetism of the alloy than germanium. With respect to the cleaning effect, however, it is evident that the addition of germanium is much more effective than molybdenum as it effects removal of nonmetallic inclusions to minimize the coercive force of the alloy obtained.

TABLE 2.—EFFECT OF THE ADDITION OF Ge AND Mo UPON THE CURIE TEMPERATURE

| Element added: | Reduction of the Curie temperature per percent weight |
|---|---|
| Ge in Ge-Permalloy | 17° C./percent weight. |
| Mo in Supermalloy | 27° C./percent weight. |

As apparent from the foregoing description, the alloy of the present invention is highly valuable as a material for magnetic cores in magnetic amplifiers, memory elements and the like.

What is claimed is:

1. A soft magnetic material of the Ni-Fe alloy type consisting essentially of 40 to 90% by weight of nickel, 0.1 to 10% by weight of germanium and the balance essentially iron.

2. A soft magnetic material of the Ni-Fe alloy type consisting essentially of 65% by weight of nickel, 4% by weight of germanium and the balance essentially iron.

References Cited by the Examiner

Alloys of Iron and Nickel, volume 1, pages 264 and 265. Edited by Marsh. Published in 1938 by the McGraw-Hill Book Company.

HYLAND BIZOT, *Primary Examiner.*

DAVID L. RECK, *Examiner.*

P. WEINSTEIN, *Assistant Examiner.*